United States Patent Office 2,863,064
Patented Dec. 2, 1958

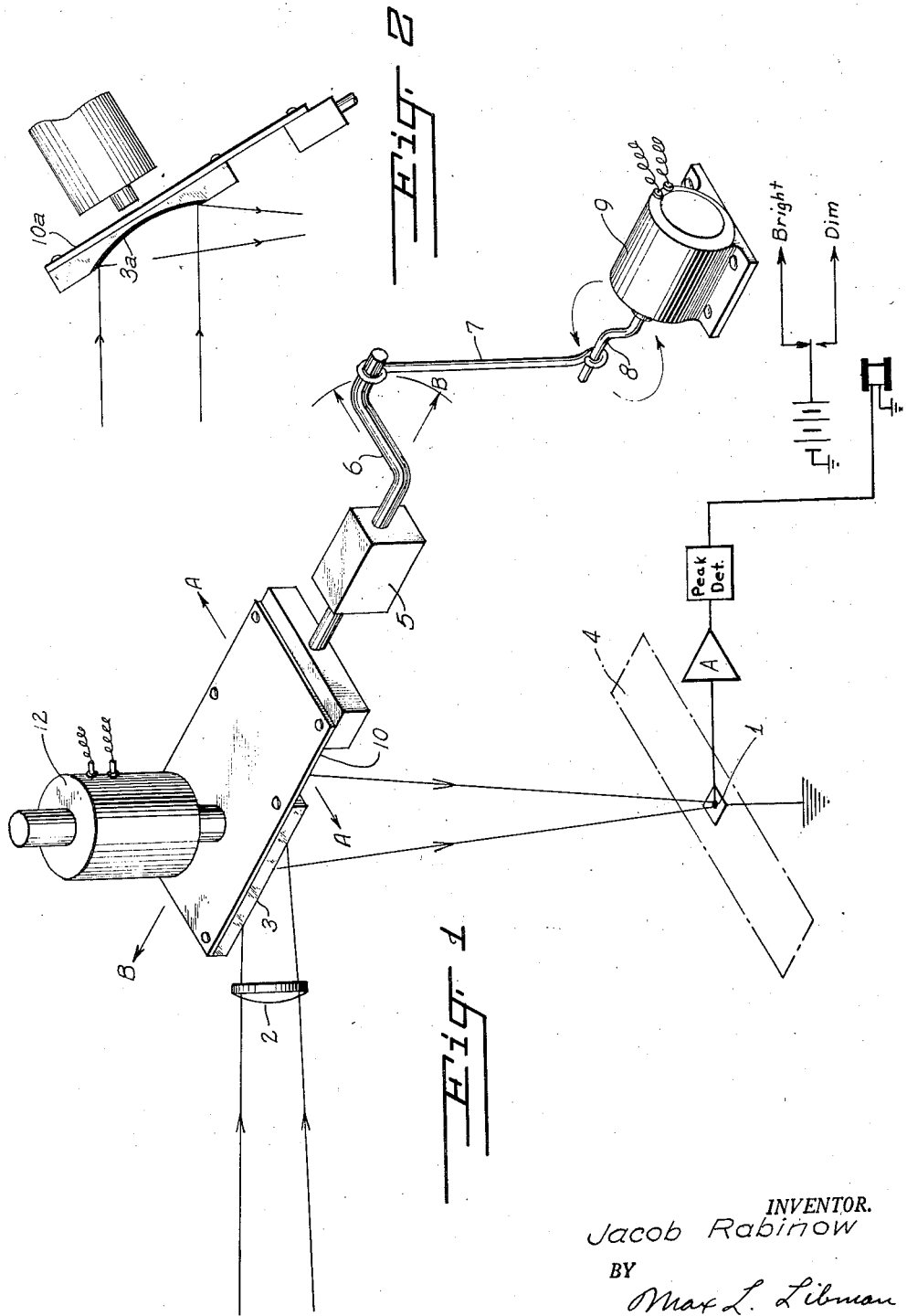

2,863,064

SCANNING TYPE HEADLIGHT DIMMER

Jacob Rabinow, Takoma Park, Md.

Application October 28, 1953, Serial No. 388,801

6 Claims. (Cl. 250—235)

This invention relates to headlight dimmers and has particular reference to dimmers in which the field of view, or an image of the field of view, is scanned to detect the presence of bright light areas or spots of light. The dimmer of the invention is adapted particularly to the use of a photocell having a very small sensitive area, such as is found in transistors, in which the sensitive area may be of the order of 0.010 inch diameter. It is a primary object of the invention to provide a scanning system which directs a very large amount of light from an oncoming headlight onto a very small surface which is photosensitive, resulting in high sensitivity of the dimmer. Another object is to provide means for producing relative scanning motion between a very small photosensitive area and the image of a field of view which may contain an oncoming headlight.

The specific nature of the invention as well as other objects and advantages thereof will clearly appear from a description of a preferred embodiment as shown in the accompanying drawing, in which:

Fig. 1 is a schematic diagram showing the basic principle of my invention; and

Fig. 2 is a schematic diagram showing a modification comprising a combined focusing and scanning device.

Light from a field of view which it is desired to scan is focussed on a small area photosensitive device such as transistor 1 by means of lens 2 after reflection from mirror surface 3. The field of view would ordinarily correspond roughly to the field of illumination of the headlights of an automobile. In order that the photosensitive element may be effected by the total area of this field of view, mirror 3 is provided with means for oscillating it slightly about two mutually perpendicular axes, A—A and B—B, so that, as the mirror oscillates, the image 4, whose boundaries are represented by dotted lines, is moved up and down as well as crossways with respect to spot 1 so that the spot scans the entire area within the dotted lines.

Motion in one direction about the axis B—B is obtained by means of rocker arm 6 supported in a fixed bearing 5 and actuated by rocker shaft 7 which in turn is driven by eccentric 8 from motor 9. Oscillation about the other axis A—A is obtained by mounting the mirror on a leaf spring 10 and exciting it by means of electromagnetic solenoid 12. This solenoid may be excited by means of alternating current or interrupted direct current, both of which are available from a conventional vibrator-type power supply, commonly used in automobile headlight dimmers. If the spring is made resonant at the frequency of the exciting magnetic pull, very little power is required to move the mirror. In order to scan the complete image, it is preferable to use two oscillation frequencies of widely different values, so that a complete set of oscillations about one axis occurs in one half of an oscillation about the other axis. It is preferable in the embodiment shown to use the higher frequency so as to produce a motion of the field along its shorter dimension, i. e., corresponding to motion about axis A—A and to use the lower frequency to produce the motion about axis B—B corresponding to the long dimension.

It will be obvious that instead of using a solenoid and a motor, identical devices can be employed to produce both motions, but the example shown is typical and results in a relatively simple and inexpensive device. Furthermore, the direct motor drive, if used for the lower frequency, provides a forced oscillation of the mirror which would override any tendency to sympathetic low frequency oscillation produced by normally occurring vibration in the vehicle.

In order to minimize the effects of car vibration on the spring suspended mirror, a balancing weight could be added on the other side of the effective pivot point, as is well known, so that translatory forces would effect both sides equally, and only rotational forces such as the solenoid supplies would be effective to cause oscillation. Because the scanning employed in this invention need not be very precise, the counterbalancing feature would generally not be required. All that is necessary is that every point of the image pass at least once per complete field scan over the sensitive area.

Several other methods of producing the relative motion between the sensitive area and the image can be employed. For example, the phototransistor itself can be mounted on a moving platform and caused to traverse the desired image area. Conversely, the lens can be moved parallel to itself so as to move the image over a stationary sensing device. Or alternatively, the whole of the device can be oscillated as a unit. In my copending application, Serial No. 385,942, filed October 14, 1953, for Automatic Headlight Dimmer, I show a curved reflector as the focussing means for producing the image. If this reflector is arranged to oscillate in the fashion desired for the mirror, the same result can be obtained without the use of the lens. This is indicated in Fig. 2 wherein leafspring 10a carries parabolic reflector 3a in place of mirror 3 of Fig. 1, thus dispensing with the need for lens 2.

The circuit employed in connection with the photocell element can be the same as that shown in my U. S. Patent No. 2,632,040 for Automatic Headlight Dimmers, or in my above referred to copending application. This prior patent shows the use of a peak detector circuit in a scanning type headlight dimmer using a Nipkow disc. Alternatively, a completely transistorized amplifier may be employed since the electrical pulses produced by the photo-transistor are of a frequency easily handled by present day transistor amplifiers.

Experience has shown that scan frequencies of about 10 to 20 fields per second are entirely satisfactory. If faster rates are desired or if smaller motions of the optical elements are required, multiple photosensitive elements may be used. For example, if two photocells are employed, spaced half the long diameter of the field image, then the amplitude of the slow scan in the original example can be reduced to one-half of the original value. Any desired smaller amplitude can be employed, depending upon the number of photosensitive elements used.

While the present day phototransistors have very small sensitive areas and are particularly suited to the use in my invention, the invention also has particular application to photoconductive cells such as lead-sulphide cells. By using a very small cell of this type, the change in conductance can be made to be very large when a bright light is focused on this very small element as compared to the conductance when the same element is exposed to the light from an equivalent area of the general background illumination.

It will be apparent that the embodiments shown are

I claim:

1. A vehicle headlight dimmer comprising optical means to produce an image of a desired portion of a field of view illuminated by the headlights of the vehicle, photoelectric means located in the plane of said image, means for cyclically moving said optical means relative to said photoelectric means so as to move said image relative to said photoelectric means so that successive portions of the entire image are scanned by said photoelectric means, and peak detector means responsive to the output of said photoelectric means to dim said headlights when the light brightness of any portion of the said image exceeds a predetermined value.

2. In a headlight dimmer, optical means to produce an image of a desired field of view, photoelectric means having an effective photosensitive surface substantially smaller than the area of said image, means to move said image relative to said photosensitive surface in the plane of the said image during such motion, said moving means comprising means to move the optical means relative to the photosensitive surface so that the latter surface completely and repeatedly scans the said image by successive portions, and means operable by the output of said photoelectric means to dim the headlights in response to light intensities in said image.

3. The invention according to claim 2, said means for producing relative motion comprising a reflecting surface for reflecting a focussed image from the field of view toward the photosensitive surface, and means for oscillating said reflecting surface simultaneously about two mutually perpendicular axes.

4. The invention according to claim 3, the respective rates of oscillation about the axes being different.

5. The invention according to claim 3, said means for producing an image comprising a curved light-concentrating surface of said mirror.

6. For use in a system responsive to the presence of a small area of markedly different illumination, in a field of view, from the illumination of adjacent area; optical means to produce a total image of a desired portion of the field of view, photoelectric means having an effective photosensitive surface substantially smaller in area than the area of said image, means to move said total image relative to said photosensitive surface in the plane of said image during such motion, said moving means comprising means to move the optical means relative to the photosensitive surface so that the latter surface completely and repeatedly scans the said total image by successive portions, and circuit actuating means operable by the output of said photoelectric means in response to the illumination of said small area.

References Cited in the file of this patent

UNITED STATES PATENTS

| | | | |
|---|---|---|---|
| 1,648,058 | Parker | Nov. 8, | 1927 |
| 2,375,677 | Moore | May 8, | 1945 |
| 2,380,486 | Willis | July 31, | 1945 |
| 2,423,254 | Rettinger | July 1, | 1947 |
| 2,457,456 | Flory | Dec. 28, | 1948 |
| 2,469,935 | Sweet | May 10, | 1949 |
| 2,486,334 | Slamar | Oct. 25, | 1949 |
| 2,489,305 | McLennan | Nov. 29, | 1949 |
| 2,602,368 | Barnes | July 8, | 1952 |
| 2,613,572 | Mathieu | Oct. 14, | 1952 |
| 2,632,040 | Rabinow | Mar. 17, | 1953 |
| 2,699,834 | O'Brien | Jan. 18, | 1955 |
| 2,759,124 | Willis | Aug. 14, | 1956 |